United States Patent [19]

Schulze et al.

[11] 4,103,069

[45] Jul. 25, 1978

[54] COATED SILVER ACTIVATED ZINC SULFIDE CATHODE RAY TUBE

[75] Inventors: Harry O. Schulze, Wyalusing; Robert E. Dodds; Raymond F. Herner, both of Towanda, all of Pa.

[73] Assignee: GTE Sylvania Incorporated, Stamford, Conn.

[21] Appl. No.: 729,905

[22] Filed: Oct. 6, 1976

[51] Int. Cl.$^2$ .................... B32B 9/00; C09K 11/10
[52] U.S. Cl. ................... 428/403; 427/64; 427/68; 252/301.6 S; 252/301.6 P; 313/467; 427/215; 427/157
[58] Field of Search ............ 427/68, 64, 58, 215, 427/157; 428/403, 404; 252/301.6 S, 301.6 P; 313/467

[56] References Cited

U.S. PATENT DOCUMENTS

| | | | |
|---|---|---|---|
| 2,965,512 | 12/1960 | Umberger | 428/403 |
| 3,684,731 | 8/1972 | Frey et al. | 252/301.6 S |
| 3,927,240 | 12/1975 | Hammond et al. | 428/403 |
| 4,020,331 | 4/1977 | Hedler et al. | 428/403 |

FOREIGN PATENT DOCUMENTS 46-35,425   10/1971   Japan .................... 427/215

*Primary Examiner*—John T. Goolkasian
*Attorney, Agent, or Firm*—John C. Fox

[57] ABSTRACT

Cathode ray phosphor compositions that are resistant to photodeposition slurries consist essentially of discrete particles of a phosphor material having a core of silver-activated zinc sulfide and a coating over a substantial amount of the external surfaces of a composition represented by the formula, $Mg_2P_2O_7:Al_4(P_2O_7)_3 \cdot xSiO_2$ wherein the coating is at a sufficient level on the surfaces to provide a $PO_4$ content of the composition of from about 0.05% to about 0.2% by weight and the $SiO_2$ content sufficient to impart flowability. The coating composition is formed by a slurry process that enables a uniform and adherent coating to be deposited on the surfaces of the particles of silver-activated zinc sulfide.

10 Claims, No Drawings

COATED SILVER ACTIVATED ZINC SULFIDE CATHODE RAY TUBE

BACKGROUND OF THE INVENTION

1. Field of the Invention

This invention relates to silver-activated zinc sulfide phosphors used as the blue-emitting component in tri-color television picture tubes. More particularly, it relates to a coated luminescent composition wherein the silver-activated zinc sulfide particles form the core and on the surface thereof a uniform adherent coating of a composition represented by the formula, $Mg_2P_2O_7 \cdot Al_4(P_2O_7)_3 \cdot XSiO_2$ is deposited. The composition does not react with the other components in the photosensitive deposition slurry.

2. Prior Art

Coatings on the surfaces of luminescent phosphors have been used to improve various characteristics of the phosphors and prevent undesired reactions with the components of the photosensitive slurries used to deposit the phosphors on the faceplate of the color picture tube. For example, $Sr_2P_2O_7$ has been used as a coating to improve the adherence of the phosphor on the faceplate and to eliminate the problem known in the art as "haze". "Haze" as used herein and in the art refers to the non-purity of the color picture resulting from cross-contamination of the three phosphors. In the manufacture of color picture tubes phosphors are deposited step-wise, that is, the complete faceplate is covered with a photosensitive slurry containing one phosphor such as a blue-emitting phosphor. The photosensitive slurry is exposed to light in a predetermined pattern. Thereafter, the faceplate is washed with water and in those areas where polymerization has not occurred the phosphor is removed by the water wash. It has been found that if the phosphor has not been coated with the proper material some of the phosphor particles continue to adhere to the faceplate. For example, as a result of the unwanted adherence some of the area that should contain only the red and green phosphor now contains the blue phosphor. The purity of the colors is thus reduced because of the emission of the undesired phosphors. As is explained in U.S. Pat. No. 3,927,240 a coating of $Sr_2P_2O_7$ resulted in reversing the charge on the surface of the particles thus overcoming the problem with "haze" or cross-contamination.

It has been found, however, that when silver-activated zinc sulfide coated with $Sr_2P_2O_7$, is mixed with the photosensitive solution to form a slurry and the slurry is stored for about 12 hours or longer a reaction occurs with one or more of the components in the photosensitive solution and imperfections occur on the surfaces of the screen. These imperfections are known in the art as "pock marks". When this occurs the faceplate panel is rejected because a bare spot occurs.

It is believed that a blue-emitting cathode ray phosphor that obviates the haze problem and does not adversely react with the components in the photosensitive solution to form surface imperfections is an advancement in the art.

OBJECTS AND SUMMARY OF THE INVENTION

It is an object of the invention to provide a blue-emitting cathode ray phosphor.

It is another object of the invention to provide a silver-activated zinc sulfide cathode ray phosphor coated with a haze resistant coating that does not form imperfections on the faceplate after prolonged storage as a photosensitive slurry.

It is still another object of this invention to provide a luminescent composition resistant to adverse reactions with components of the photosensitive solutions.

It is a further object of this invention to provide a process for producing a luminescent composition having a core of silver-activated zinc sulfide (ZnS:Ag) particles and an adherent coating on the surfaces of the particles of a resistant composition of magnesium pyrophosphate, aluminum pyrophosphate and silicon dioxide.

These and other objects of this invention are achieved in one aspect of the invention wherein a luminescent composition, suitable as a blue-emitting cathode ray phosphor, consisting essentially of discrete particles having an average particle size of from about 5 to about 20 micrometers with the preferred size range being an average particle size of from about 6 to about 12 micrometers. The particles consist essentially of a core of silver-activated zinc sulfide and an adherent coating on the external surfaces of the core of magnesium pyrophosphate, aluminum pyrophosphate and silicon dioxide wherein the $PO_4$ content of the coating is from about 0.05% to about 0.2% by weight of the total composition and the $SiO_2$ content is from about 0.02% to about 0.07% by weight of the total composition.

In another aspect of this invention there is provided a process for applying the beforementioned coating on the surfaces of the silver-activated zinc sulfide. The process involves forming a relatively uniform first slurry of water, silver-activated zinc sulfide phosphor and a water-soluble source of pyrophosphate and a water-soluble silicon dioxide source, adding an aqueous solution of a water-soluble aluminum source and a water-soluble magnesium source to the first slurry to form a second slurry, the weight ratio of ZnS:Ag to $P_2O_7$ being about from 500:1 to about 2000:1, the $P_2O_7$ to Al weight ratio being from about 4.3:1 to about 6:1, and the $P_2O_7$ to $SiO_2$ weight ratio being from about 0.67:1 to about 9.5:1, and the $P_2O_7$ to Mg weight ratio being from about 10:1 to about 13.5:1, 5:1 in the second slurry, providing sufficient agitation to form a relatively uniform slurry, separating the solid phase from the liquid phase, washing the solids with water, drying the solids, and heating the solids at a temperature of from about 400° C to about 500° C for about 1.5 to about 2.5 hours.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-description of some of the aspects of the invention.

The compositions of this invention comprise a core of a blue-emitting zinc sulfide phosphor, activated by silver. As used herein, the term "blue-emitting" means that the material emits blue light with a substantial portion in the range of from about 430 to about 500 nanometers when subjected to cathode ray bombardment. Since the coating that is applied is generally very small in the order of about 0.1% of the total phosphor weight, the coating thickness is very thin and relatively uniformly distributed over the surface of the particle thus it does not appreciably change the average particle sizes as measured by the Fisher Sub-Sieve Sizer or by the Coulter Counter Method. The average particle size will preferably vary from about 6 to about 12 micrometers primarily depending upon the technique used to deposit the phosphors on the faceplate, although material having an average particle size from about 5 to about 20 micrometers has been used. While the materials of this inventon solve a problem primarily associated with the slurry technique of depositing phosphors, the other technique referred to in the industry as the "dusting" technique can be used equally well.

The coating is magnesium pyrophosphate and aluminum pyrophosphate with a small amount of silicon dioxide. The level of silicon dioxide (silica) is preferably kept at from about 0.02% to about 0.07% by weight of the total composition weight. Silica is used primarily to improve the handling characteristics of the phosphor composition. If levels of silica above about 0.07% by weight are used, the "haze" problem (referred to previously) occurs. If amounts less than about 0.02% are used then the handling characteristics are not significantly improved over a material without the silica and the composition does not flow as well and tends to agglomerate. Any water soluble source of silica that will disassociate in the reaction media to form $SiO_2$ can be used. Preferred sources are the alkali metal and soluble silicates with potassium silicate being the especially preferred source.

The level of silver-activator used in the blue-emitting zinc sulfide is well known in the art and does not constitute a portion of the present invention. Conventional synthesis techniques are used to prepare the blue-emitting zinc sulfide and the process hereinafter described is directed to a material that has been synthesized into a luminescent material. The normal firing and washing steps are taken prior to the hereindescribed treatments. Since those techniques are well known in the art and are disclosed in numerous patents, as for example, U.S. Pat. No. 3,684,731 and 3,666,677, the synthesis techniques for the activated zinc sulfide will not be described herein. As is known in the art other materials in small amounts can be included in the ZnS:Ag phosphor as is shown in U.S. Pat. No. 3,666,677.

The formation of the magnesium pyrophosphate and aluminum pyrophosphate is achieved by reacting, in an aqueous media, the respective water-soluble metal salt with a water-soluble pyrophosphate. A replacement reaction occurs whereby the aluminum and magnesium replace the metal in the water-soluble pyrophosphate. An excess of the magnesium and aluminum source is used because the excess reactants are water soluble. The relative amounts of $Mg_2P_2O_7$ and $Al_4(P_2O_7)_3$ that are formed are on a 1:1 molar basis. The reaction, as previously mentioned, is limited by the pyrophosphate ion. A sufficient amount of pyrophosphate salt is used to provide an equivalent $PO_4$ content of the coated product of from about 0.05% to about 0.2% by weight. Thus the amount of water-soluble pyrophosphate to be used can easily be calculated because the amount of $Mg_2P_2O_7 \cdot Al_4(P_2O_7)_3$ that is deposited is nearly the theoretical amount when there is at least about 10% excess of the magnesium and aluminum source present. In the beforementioned formula, $Mg_2P_2O_7:Al_4(P_2O_7)_3 \cdot xSiO_2$, $x$ can vary from about 1.2 to about 16 depending upon the equivalent $PO_4$ content and the $SiO_2$ content.

Suitable sources of magnesium and aluminum include the water-soluble salts of magnesium and aluminum. As used herein "water-soluble" means that at least 0.1 grams of the material will dissolve in 100 milliliters of distilled water at 20° C. Preferred magnesium and aluminum salts are the salts of the inorganic acids, such as sulfuric, hydrochloric, nitric, and the like, of these magnesium and aluminum sulfates are preferred. Any water soluble source of the pyrophosphate ion can be used, however, the alkali metal pyrophosphates are preferred. While pyrophosphoric acid can be used, relatively pure pyrophosphoric acid is relatively expensive, because it tends to hydrolyze to orthophosphoric acid. The water soluble pyrophosphate salts are relatively stable, when not in solution for excessive periods of time, that is, in excess of about 4 hours.

Because of the tendency of the pyrophosphate to hydrolyze to the orthophosphates after the water-soluble source of the pyrophosphate is dissolved in the water, the source of magnesium and aluminum are added shortly after the pyrophosphate salt has been dissolved. Generally, the magnesium and aluminum sources are added within one half hour after the pyrophosphate has been dissolved. It is preferred to add the magnesium and aluminum sources as a solution to an aqueous slurry of the silver-activated zinc sulfide containing about 20% to about 30% by weight of the zinc sulfide and from about 0.1 to about 0.3% by weight of the pyrophosphate source, that had been agitated sufficiently to form a relatively uniform admixture. The reaction temperature is from about 40° C to about 90° C and the reaction occurs within about 5 to about 30 minutes.

After the reaction has occurred the solids, the zinc sulfide coated with the $Mg_2P_2O_7:Al_4(P_2O_7)_3$ and sufficient $SiO_2$ to impart flowability, is separated from the aqueous phase that contains most of the unreacted materials and the water-soluble by-products. The solids are washed with sufficient water to remove any residual occluded unreacted materials and by-products. After drying, the material is annealed for from about 1 to 4 hours at a temperature of from about 425° C to about 475° C. After screening to remove any particles larger than the openings in about a 325 mesh screen the coated material is ready for depositing and even upon prolonged storage, e.g. longer than 24 hours, in a photosensitive slurry shows no signs of adverse reaction or degradation.

Thus, the process comprises forming a relatively uniform first slurry of water, silver-activated zinc sulfide phosphor and a water-soluble source of pyrophosphate source and a water-soluble silicon dioxide source, adding an aqueous solution of a water-soluble aluminum source and a water-soluble magnesium source to the first slurry to form a second slurry, the weight ratio of ZnS:Ag to $P_2O_7$ being about from 500:1 to about 2000:1, the $P_2O_7$ to Al weight ratio being from about 4.3:1 to about 6:1, the $P_2O_7$ to $SiO_2$ weight ratio being from about 0.67:1 to about 9.5:1, and the $P_2O_7$ to Mg weight ratio being from about 10:1 to about 13.5:1, 5:1 in the second slurry, providing sufficient agitation to form a relatively uniform slurry, separating the solid phase from the liquid phase, washing the solids with water, drying the solids, and heating the solids at a temperature of from about 400° C to about 500° C for about 1.5 to about 2.5 hours.

To more fully illustrate the subject invention, the following detailed example is presented. All parts, proportions, and percentages are by weight unless otherwise indicated.

EXAMPLE I

A slurry containing about 1000 parts of cathodoluminescent grade ZnS:Ag and about 4000 parts of water is formed and about 4.4 parts of $Na_4P_2O_7 \cdot 10 H_2O$ is added. About 4 parts of an aqueous solution containing about 1 part of potassium silicate is added to the slurry and agitated for about 10 minutes. Separately, an aqueous solution containing about 8 parts of $Al_2(SO_4)_3 \cdot 14 H_2O$ and about 4 parts of $MgSO_4 \cdot 7 H_2O$ and 250 parts of water is prepared and then added to the slurry. Agitation is continued for about 10 minutes and then the solid phase and liquid phase are separated. The solids are washed with 2 separate washes of about 4000 parts of water. The washed material is dried at about 110° C to 140° C for about 8 hours and then heated for an additional two hours, at about 450° C. Samples of the material indicate a $PO_4$ analysis of about 0.1% by weight and 0.05% by eight of $SiO_2$.

Television screens made using this material via the slurry process show insignificant cross-contamination or haze and microscopic examination of the coated phosphor with the photosensitive slurry show no adverse reactions have occurred as indicated by the absence of imperfections called "pock marks" on the surface of the coated faceplate.

While there has been shown and described what are at present considered the preferred embodiments of the invention, it will be obvious to those skilled in the art that various changes and modifications may be made therein without departing from the scope of the invention as defined by the appended claims.

What is claimed is:

1. Cathode ray phosphor compositions consisting essentially of discrete particles of a cathodoluminescent material having an average particle size of from about 5 to about 20 micrometers and consisting essentially of a core of a conventional silver-activated zinc sulfide and an adherent relatively uniform coating of magnesium pyrophosphate, aluminum pyrophosphate, and silicon dioxide, with said phosphates being in an equal molar relationship, said coating being at a sufficient level to provide a $PO_4$ content of from about 0.05% to about 0.2% by weight of the total composition and the silicon dioxide content of the total composition is from about 0.02% to about 0.07% by weight of the total composition.

2. A composition according to claim 1 wherein the coating is defined by the formula, $Mg_2P_2O_7:Al_4(P_2O_7)_3 \cdot xSiO_2$ wherein $x$ is from about 1.2 to about 16.

3. A process suitable for coating zinc sulfide comprising
    (a) forming a relatively uniform first slurry of water, cathodoluminescent grade silver-activated zinc sulfide, and a water-soluble pyrophosphate source and a water-soluble silicon dioxide source,
    (b) adding an aqueous solution of a water-soluble aluminum source and a water-soluble magnesium source to the first slurry to form a second slurry, the weight ratio of ZnS:Ag to $P_2O_7$ being from about 500:1 to about 2000:1, the $P_2O_7$ to Al weight ratio being from about 4.5:1 to about 6:1, the $P_2O_7$ to $SiO_2$ weight ratio being from about 0.67:1 to about 9.5:1 and the $P_2O_7$ to Mg weight ratio being from about 10:1 to about 13.5:1 in the second slurry,
    (c) providing sufficient agitation to form a relatively uniform slurry,
    (d) separating the resulting solid phase from the liquid phase,
    (e) washing the solids with sufficient water to remove cationic and anionic impurities and resulting occluded unreacted materials
    (f) drying the solids, and
    (g) heating the solids at a temperature of from about 400° C to about 500° C for about 1.5 to about 2.5 hours.

4. A process according to claim 3 wherein said pyrophosphate source is an alkali metal pyrophosphate.

5. A process according to claim 4 wherein said alkali metal pyrophosphate is sodium pyrophosphate.

6. A process according to claim 3 wherein said silicon dioxide source is an alkali metal or soluble silicate.

7. A process according to claim 5 wherein said silicon dioxide source is potassium silicate.

8. A process according to claim 3 wherein said magnesium and aluminum sources are salts of inorganic acids.

9. A process according to claim 8 wherein said salts are magnesium sulfate and aluminum sulfate.

10. A process according to claim 5 wherein said magnesium source is magnesium sulfate and said aluminum source is aluminum sulfate.

* * * * *